(12) United States Patent
Groves et al.

(10) Patent No.: US 12,715,102 B2
(45) Date of Patent: Aug. 25, 2026

(54) MODULAR WORK STATION

(71) Applicant: TECHTRONIC CORDLESS GP, Anderson, SC (US)

(72) Inventors: Jeffrey Groves, Greenville, SC (US); Tyler H. Knight, Mauldin, SC (US); Miles Riordan Moody, Greenville, SC (US); Gabriel James Sandoval, Piedmont, SC (US); Lindsay Van-Rooyen, Greenville, SC (US); Edwin C. Wentzky, Anderson, SC (US); Andrew N. Robinson, Williamston, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 19/018,953

(22) Filed: Jan. 13, 2025

(65) Prior Publication Data

US 2025/0144783 A1 May 8, 2025

Related U.S. Application Data

(63) Continuation of application No. 18/470,320, filed on Sep. 19, 2023, now Pat. No. 12,194,612, which is a (Continued)

(51) Int. Cl.
*B25H 1/04* (2006.01)
*B23B 47/26* (2006.01)
(Continued)

(52) U.S. Cl.
CPC ............... *B25H 1/04* (2013.01); *B23B 47/26* (2013.01); *B25H 1/0042* (2013.01); *B25H 1/12* (2013.01); *B25H 3/006* (2013.01)

(58) Field of Classification Search
CPC .......... B25H 1/04; B25H 1/0042; B25H 1/12; B25H 3/006; B23B 47/26
See application file for complete search history.

(56) References Cited

U.S. PATENT DOCUMENTS 3,120,136 A 2/1964 Bieker
3,837,757 A 9/1974 Levine
(Continued)

FOREIGN PATENT DOCUMENTS

CN 203839228 U 9/2014
CN 204178943 U 2/2015
(Continued)

OTHER PUBLICATIONS

Partial European Search Report for Application No. 21205956.2 dated Apr. 7, 2022 (11 pages).
(Continued)

*Primary Examiner* — Nathaniel C Chukwurah
(74) *Attorney, Agent, or Firm* — Michael Best & Friedrich LLP

(57) ABSTRACT

A work station may include a platform defining a working surface configured to support a tool assembly. The platform has a seat. The work station may include a base portion supporting the platform, and a table removably coupled to the platform on the seat. When the table is positioned on the seat, the table and the seat are secured to each other by an attachment structure.

17 Claims, 16 Drawing Sheets

Related U.S. Application Data continuation of application No. 17/514,739, filed on Oct. 29, 2021, now Pat. No. 11,845,178.

(60) Provisional application No. 63/157,323, filed on Mar. 5, 2021, provisional application No. 63/109,109, filed on Nov. 3, 2020.

(51) Int. Cl.

| | |
|---|---|
| ***B25H 1/00*** | (2006.01) |
| ***B25H 1/12*** | (2006.01) |
| ***B25H 3/00*** | (2006.01) |

(56) References Cited

U.S. PATENT DOCUMENTS

| | | | | |
|---|---|---|---|---|
| 3,853,420 | A * | 12/1974 | Abell | B25H 1/0042 408/110 |
| 3,963,890 | A | 6/1976 | Straihammer | |
| 3,980,849 | A | 9/1976 | Straihammer | |
| 3,983,344 | A | 9/1976 | Straihammer | |
| 4,265,283 | A * | 5/1981 | Nash | B27C 9/00 144/286.5 |
| 4,277,660 | A | 7/1981 | Lemmer | |
| 4,293,746 | A | 10/1981 | Braaten | |
| 4,487,305 | A | 12/1984 | Wagner | |
| 4,510,980 | A | 4/1985 | Bartlett et al. | |
| 5,039,973 | A | 8/1991 | Carballo | |
| 5,115,567 | A | 5/1992 | Yang et al. | |
| 5,245,735 | A | 9/1993 | Tanashian | |
| 5,328,303 | A | 7/1994 | Jang | |
| 5,407,380 | A | 4/1995 | Salkewicz | |
| 5,515,930 | A | 5/1996 | Glaser | |
| 5,927,976 | A | 7/1999 | Wu | |
| 6,064,015 | A | 5/2000 | Braaten | |
| 6,223,794 | B1 | 5/2001 | Jones | |
| D478,323 | S | 8/2003 | Peterson et al. | |
| 6,639,332 | B2 | 10/2003 | Metzler et al. | |
| 6,689,975 | B2 | 2/2004 | Metzler et al. | |
| 6,862,951 | B2 | 3/2005 | Peterson et al. | |
| 6,894,236 | B2 | 5/2005 | Chappuis | |
| 7,012,203 | B2 | 3/2006 | Hanson et al. | |
| 7,077,179 | B1 | 7/2006 | Camiano et al. | |
| 7,185,555 | B2 | 3/2007 | Peterson et al. | |
| 7,211,972 | B2 | 5/2007 | Garcia et al. | |
| 7,373,710 | B2 * | 5/2008 | Elsworthy | B25H 3/006 144/286.5 |
| 7,428,439 | B1 | 9/2008 | Reynolds et al. | |
| 8,465,473 | B2 | 6/2013 | Horvath | |
| 8,888,417 | B2 | 11/2014 | Jonsson et al. | |
| 9,561,568 | B2 | 2/2017 | Brotto | |
| 9,782,865 | B2 | 10/2017 | Richt et al. | |
| 9,924,954 | B2 | 3/2018 | Guo et al. | |
| 10,118,265 | B2 | 11/2018 | Brotto | |
| 10,369,670 | B2 | 8/2019 | Brotto | |
| 10,503,199 | B1 | 12/2019 | Cone et al. | |
| 10,921,842 | B2 | 2/2021 | Cone et al. | |
| 2005/0147940 | A1 | 7/2005 | Mace | |
| 2007/0113369 | A1 | 5/2007 | Cochran et al. | |
| 2008/0083106 | A1 | 4/2008 | Elsworthy | |
| 2015/0206675 | A1 | 7/2015 | Modi et al. | |
| 2016/0039086 | A1 | 2/2016 | Maes | |
| 2016/0129582 | A1 | 5/2016 | Ullrich | |
| 2021/0221561 | A1 | 7/2021 | Davidian et al. | |

FOREIGN PATENT DOCUMENTS

| | | | |
|---|---|---|---|
| CN | 204178945 | U | 2/2015 |
| CN | 205069415 | U | 3/2016 |
| CN | 206029803 | U | 3/2017 |
| CN | 206883580 | U | 1/2018 |
| CN | 206921699 | U | 1/2018 |
| CN | 107900989 | A | 4/2018 |
| CN | 207367801 | U | 5/2018 |
| CN | 110355405 | B | 5/2020 |
| CN | 212706662 | U | 3/2021 |
| DE | 666918 | C | 10/1938 |
| DE | 2724051 | A1 | 12/1978 |
| DE | 2821969 | A1 | 11/1979 |
| DE | 2926816 | A1 | 1/1981 |
| DE | 3221709 | A1 | 12/1983 |
| DE | 8313847 | U1 | 12/1983 |
| DE | 29713822 | U1 | 10/1997 |
| DE | 20105851 | U1 | 10/2001 |
| DE | 20311296 | U1 | 10/2003 |
| DE | 20312016 | U1 | 10/2003 |
| EP | 3085318 | A1 | 10/2016 |
| EP | 3109008 | B1 | 8/2018 |
| EP | 3692943 | A1 | 8/2020 |
| GB | 2250870 | A | 6/1992 |
| WO | WO2014157463 | A1 | 10/2014 |
| WO | WO2014181764 | A1 | 11/2014 |
| WO | WO2014192783 | A1 | 12/2014 |
| WO | WO2014192785 | A1 | 12/2014 |
| WO | WO2021006734 | A1 | 1/2021 |

OTHER PUBLICATIONS

Extended European Search Report for Application No. 21205956.2 dated Sep. 9, 2022 (11 pages).

* cited by examiner

MODULAR WORK STATION

CROSS-REFERENCE TO RELATED APPLICATIONS

This application is a continuation of U.S. patent application Ser. No. 18/470,320, filed Sep. 19, 2023, and issued as U.S. Pat. No. 12,194,612, which is a continuation of U.S. patent application Ser. No. 17/514,739, filed Oct. 29, 2021, and issued as U.S. Pat. No. 11,845,178, which claims priority to U.S. Provisional Patent Application No. 63/109,109 filed on Nov. 3, 2020, and U.S. Provisional Patent Application No. 63/157,323 filed on Mar. 5, 2021, the entire contents of each of which are incorporated herein by reference.

FIELD

The present disclosure relates to a modular work station. More particularly, the present disclosure relates to interchangeable working platforms for use with a portable and stackable work station and storage system. Embodiments of the present disclosure additionally relate to a foot pedal for controlling a power tool.

SUMMARY

In one independent aspect, a modular work station includes a platform supporting a stem; a power tool coupled to the stem and supported for movement relative to the stem; and a table removably coupled to the platform, the table including a first working surface and a second working surface opposite the first working surface, the table being selectively coupled to the platform in a first orientation and a second orientation, the first working surface facing toward the power tool while the table is in the first orientation, and the second working surface facing toward the power tool while the table is in the second orientation.

In another independent aspect, a stackable work station includes a platform supporting a work surface; a power tool removably coupled to the working platform and supported for movement relative to the work surface; a base portion supporting the platform; and a table removably coupled to the platform. The base portion includes a lower surface having at least one first mating feature configured to engage a complementary second mating feature positioned on a support surface in a stacked configuration, the lower surface being releasably securable to the support surface. The table includes a first working surface and a second working surface opposite the first working surface, and the table is selectively coupled to the platform in a first orientation and a second orientation. The first working surface faces toward the power tool while the table is in the first orientation, and the second working surface faces toward the power tool while the table is in the second orientation.

In still another independent aspect, a work station includes: a platform supporting a work surface; a power tool including a motor for driving a bit, the power tool supported for movement relative to the work surface; and a foot pedal configured to control operation of the power tool, actuation of the foot pedal causing activation of the motor, the foot pedal configured to be selectively powered by a DC power source.

In some aspects, the techniques described herein relate to a work station including: a platform defining a working surface configured to support a tool assembly, the platform including a seat; a base portion supporting the platform; and a table removably coupled to the platform on the seat, wherein, when the table is positioned on the seat, the table and the seat are secured to each other by an attachment structure.

In some aspects, the techniques described herein relate to a work station including: a first working surface configured to support a tool assembly; a base portion supporting the first working surface; and a table removably coupled to the first working surface or the base portion, the table including a cover at least partially defining a second working surface, a base panel disposed opposite the cover, and a base body disposed between and coupled to the cover and the base panel, the cover rotatably coupled to the base body.

In some aspects, the techniques described herein relate to a work station including: a platform defining a working surface configured to removably support a tool assembly including a motor, and the platform including a battery receptacle configured to support a battery pack electrically coupled to the motor by one or more electrical contacts; a base portion supporting the platform; and a table removably coupled to the working surface or the base portion.

Other aspects will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The subject matter is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

The use of "including," "comprising," or "having," and variations thereof herein is meant to encompass the items listed thereafter and equivalents thereof as well as additional items. Unless specified or limited otherwise, the terms "mounted," "connected," "supported," and "coupled," and variations thereof are used broadly and encompass both direct and indirect mountings, connections, supports, and couplings. Further, "connected" and "coupled" are not restricted to physical or mechanical connections or couplings.

DETAILED DESCRIPTION

The disclosure generally relates to a hobby station or work station 10 that can accommodate and/or support a power tool, such as a rotary tool.

Figure 1:
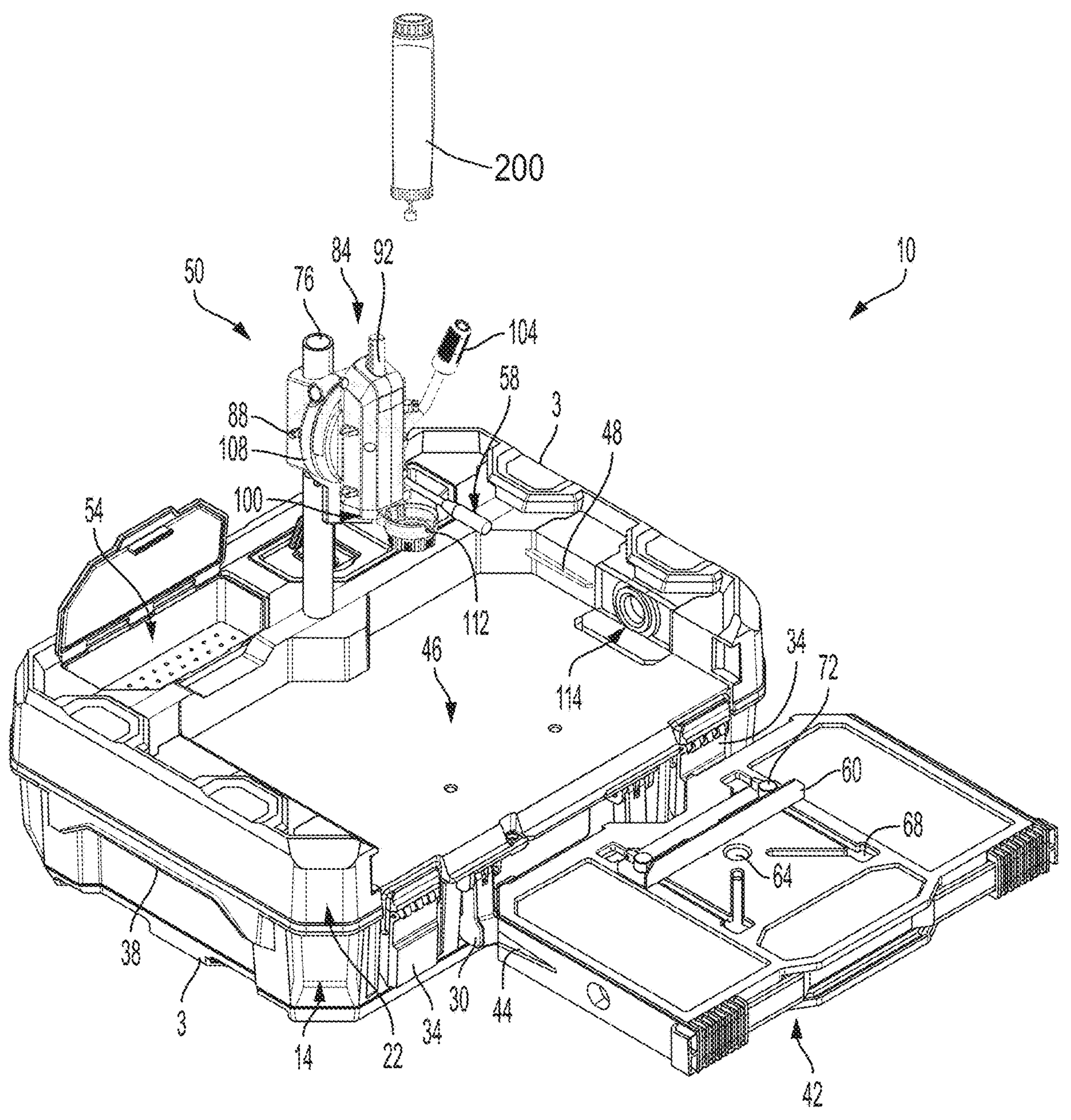
FIG. 1 is a perspective view of a modular work station according to one embodiment, with a table portion removed from a working platform.

As shown in FIG. 1, a work station 10 includes a working surface or platform 22. In the illustrated embodiment, the platform 22 is coupled to a base 14 that is formed as a container including a storage area or space 18 (FIG. 3), and the platform 22 is formed on a portion (e.g., a lid) that is pivotably coupled to the base 14 by a hinge 26. The lid can be moved between a closed position (FIG. 2) in which the platform 22 substantially covers the storage space 18, and an open position (FIG. 3) in which the storage space 18 is accessible. One or more latches 34 may releasably secure the platform 22 against the base 14 in the closed position. Also, in some embodiments, an inner surface of the platform 22 may include one or more additional storage elements (e.g., a bit storage container). In some embodiments, the work station 10 includes a receptacle configured to receive an AC power source. In other embodiments, the receptacle is configured to output power from one or more power sources supported by the work station 10.

The base 14 may include a rotatable carrying handle 30 and may also include one or more grip portions (e.g., ledges) 38 positioned on the sides to facilitate carriage of the work station 10. In the illustrated embodiment, the side ledges 38 may be an alternate carrying handle, may serve as a surface upon which a user may grasp for stability or balance during operation of a task, and/or may serve another purpose.

Figure 4:
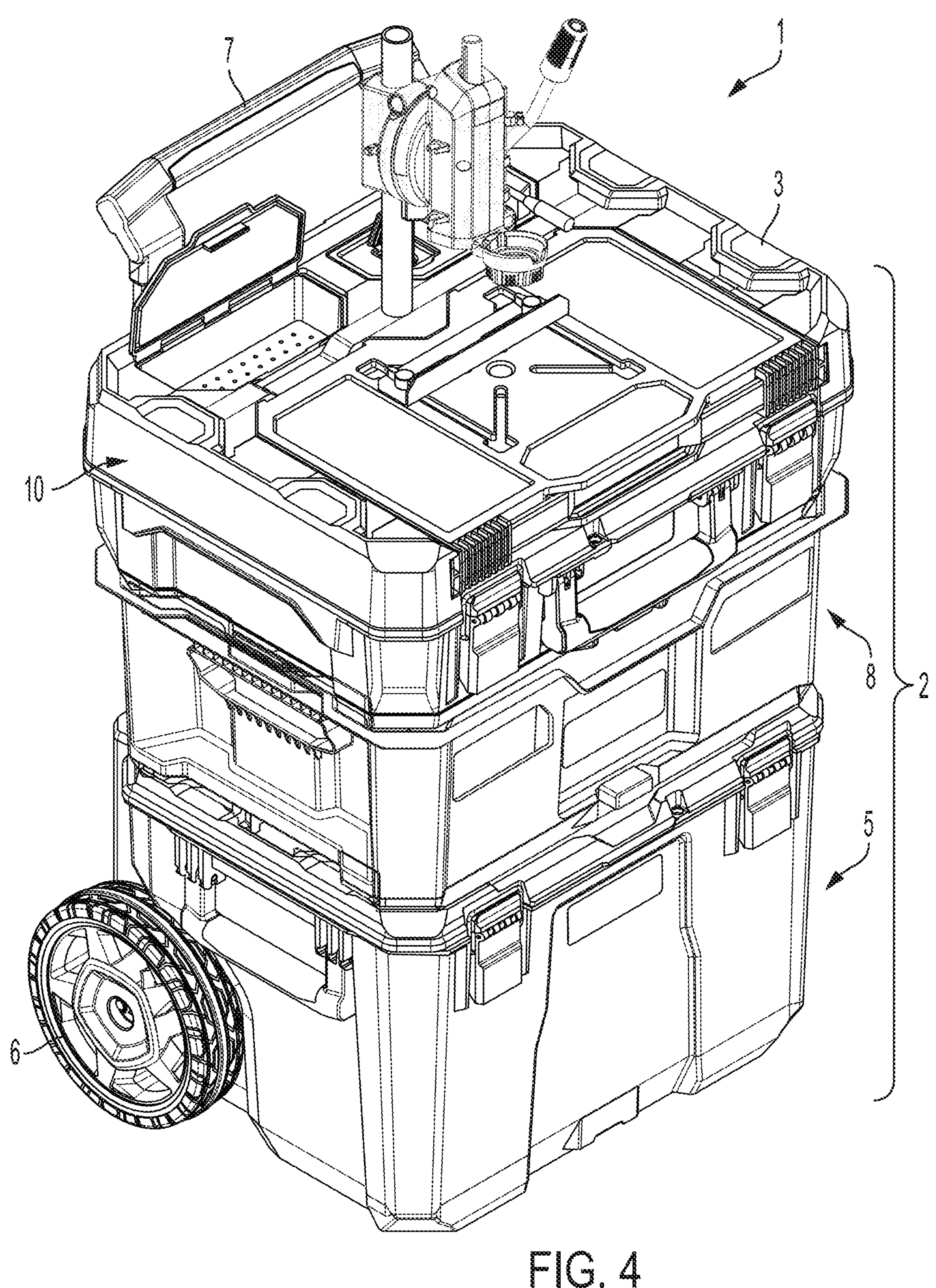
FIG. 4 is a perspective view of one example arrangement of the work station engaging other storage elements in a stacked configuration.
Figure 5:
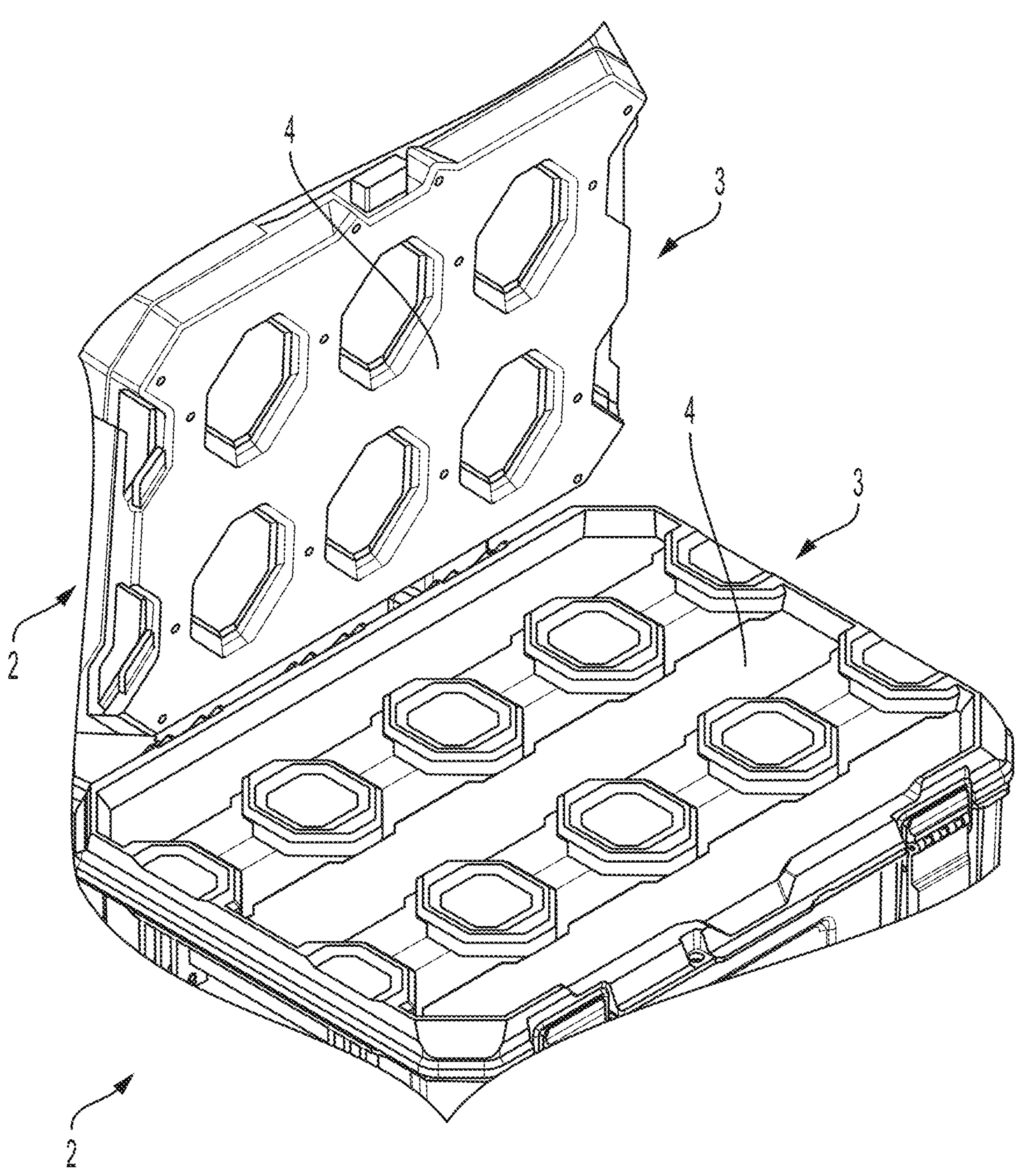
FIG. 5 is an isolated perspective view showing an exemplary stacking interface between elements of the work station of FIG. 1.

In the illustrated embodiment, the base 14 may include a mating interface 3 on a surface (e.g., a bottom surface) that is complementary or similar to a mating interface of another storage element. For example, FIG. 4 shows an exemplary arrangement of the work station 10 coupled to other structures in a stacked relationship. Each of the stacked elements (collectively identified by the reference number 2) engages another one of the stacked elements 2 at a mating interface 3. As shown in FIG. 5, in some embodiments the adjacent stacked faces 4 of each element 2 (e.g., a lower face 4 of an upper element 2 adjacent an upper face 4 of a lower element 2) include a latch member to secure the elements in a stacked relationship. For example, the mating interface 3 may be similar to the interface for mating complementary surfaces of storage containers relative to one another disclosed in U.S. patent application Ser. No. 17/153,251 filed on Jan. 20, 2021, the entire contents of which are incorporated herein by reference. In other embodiments, the interface between stacked elements may be configured in a different manner. In the illustrated embodiment, the work station 10 is a second stackable element that includes a second portion of the mating interface 3 from a stacked element 2. The second portion of the interface of the work station 10 can be opposite and complementary to the first portion of the mating interface provided by the stacked element 2.

The stacked elements 2 may include various types of containers, including (for example) a wheeled storage container 5 having wheels 6 and a pulling handle 7 and/or an open top crate 8, as well as the work station 10. In other arrangements, the work station 10 and storage system 1 may include additional stackable elements, such as a toolbox, a power tool holder, a case for retaining multiple tool accessory bins, or the like, that each have complementary faces supporting a mating interface substantially similar to the mating interface 3. A user may adjust a height of the work station 10 and, more particularly, the working platform 22 by stacking the work station 10 on one or more components and/or by stacking the work station 10 on components having different heights to accommodate available space, a height of the user, and other considerations.

Referring again to FIG. 1, the working platform 22 provides a working/project surface for a user and may be configured differently depending on a desired task or project. The working platform 22 may include a removable table 42, a seat 46, a removable and interchangeable tool assembly 50, one or more tool accessory (e.g., drill bit, socket, etc.) storage compartments 54, one or more powered operation accessories 58 (i.e., flexible light), and a complementary portion of the mating interface 3. The table 42 may include one or more slots 44 each configured to receive a tab 48 formed within the seat 46. In the illustrated embodiment, the slots 44 and tabs 48 provide a snap-fit or detent engagement between the table 42 and the seat 46. In other embodiments, the table 42 and/or seat 46 may include a spring-biased plunger, and/or the table 42 may be coupled to the seat 46 in a different manner such as by one or more fasteners configured to selectively lock the table 42 and seat 46 to one another. In other embodiments, the table 42 may be a drawer moveable relative to the seat 46. As will be described in greater detail below with reference to FIGS. 6A and 6B, the table 42 may also be reversable and include different working surfaces configured for different desired operations or applications.

In the illustrated embodiment, according to one example, the tool assembly 50 is a motorized or powered rotary tool drill press 50, and the table 42 is a complementary table for a rotary tool drill press. For example, the table 42 includes an adjustable fence 60, a relief hole 64 for receiving an end of a pilot device (e.g., drill bit), channels or guide grooves 68, and one or more fasteners 72 for securing the fence 60 and/or a workpiece to the table 42 in a desired configuration. In some embodiments, the fasteners and fence may include a vice, an adjustable clamp, or another device suitable to secure an object or workpiece to the table.

In other constructions, the tool assembly 50 is another type of powered tool such as a chop/miter saw, a table saw, a bandsaw, a cordless drill, a belt sander, a die grinder, or the like. Accordingly, while the illustrated table 42 is complementary to a rotary drill press, the table could have other constructions complementary to any of the interchangeable tool assemblies 50 discussed or otherwise. For example, in one possible construction in which the tool assembly is a power saw, the table may include a relief slot or groove configured to receive cutting teeth positioned on an edge of the saw blade.

Figure 2:
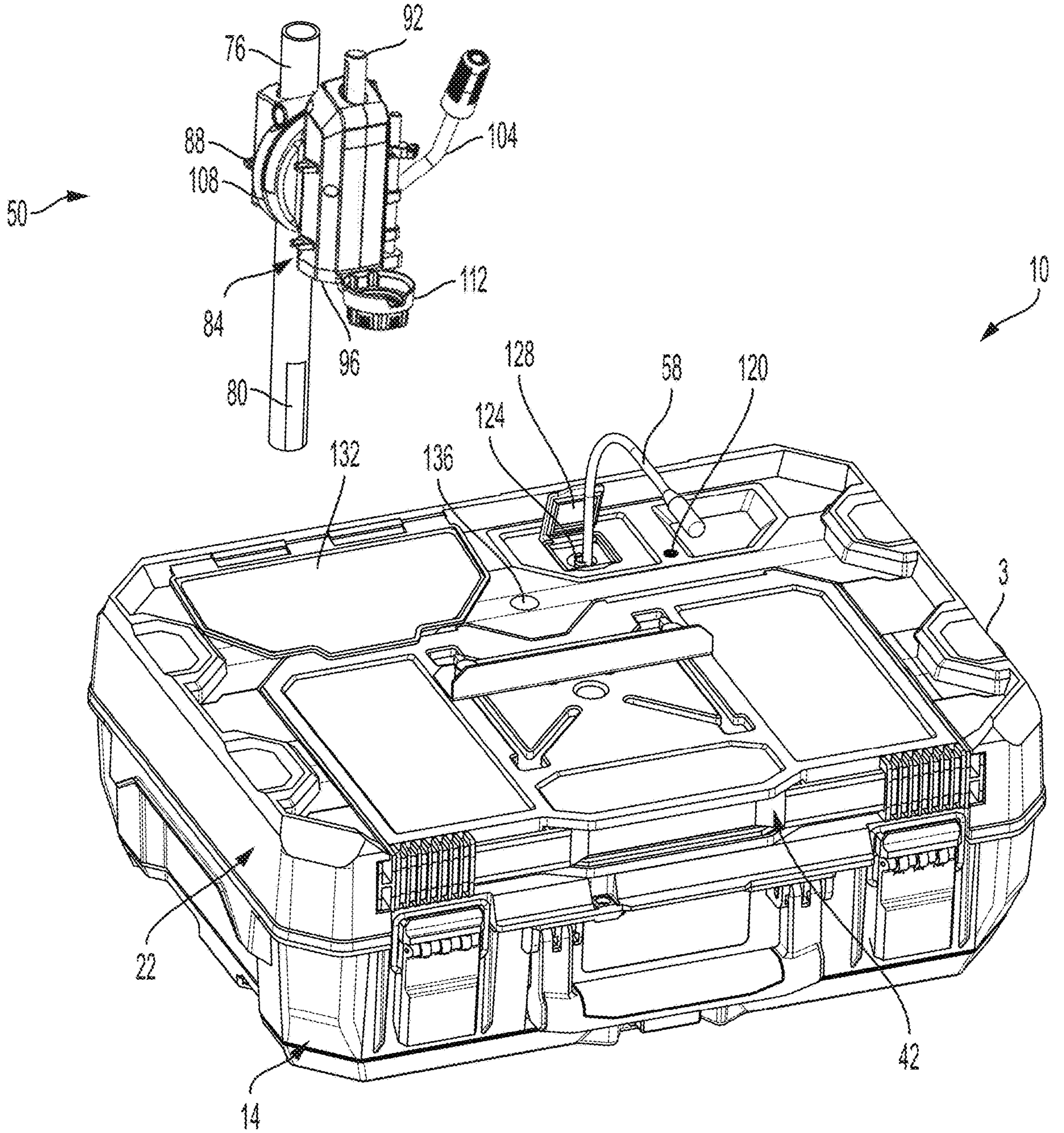
FIG. 2 is a perspective view of the modular work station of FIG. 3 in a closed state, with a power tool system removed from the working platform.
Figure 3:
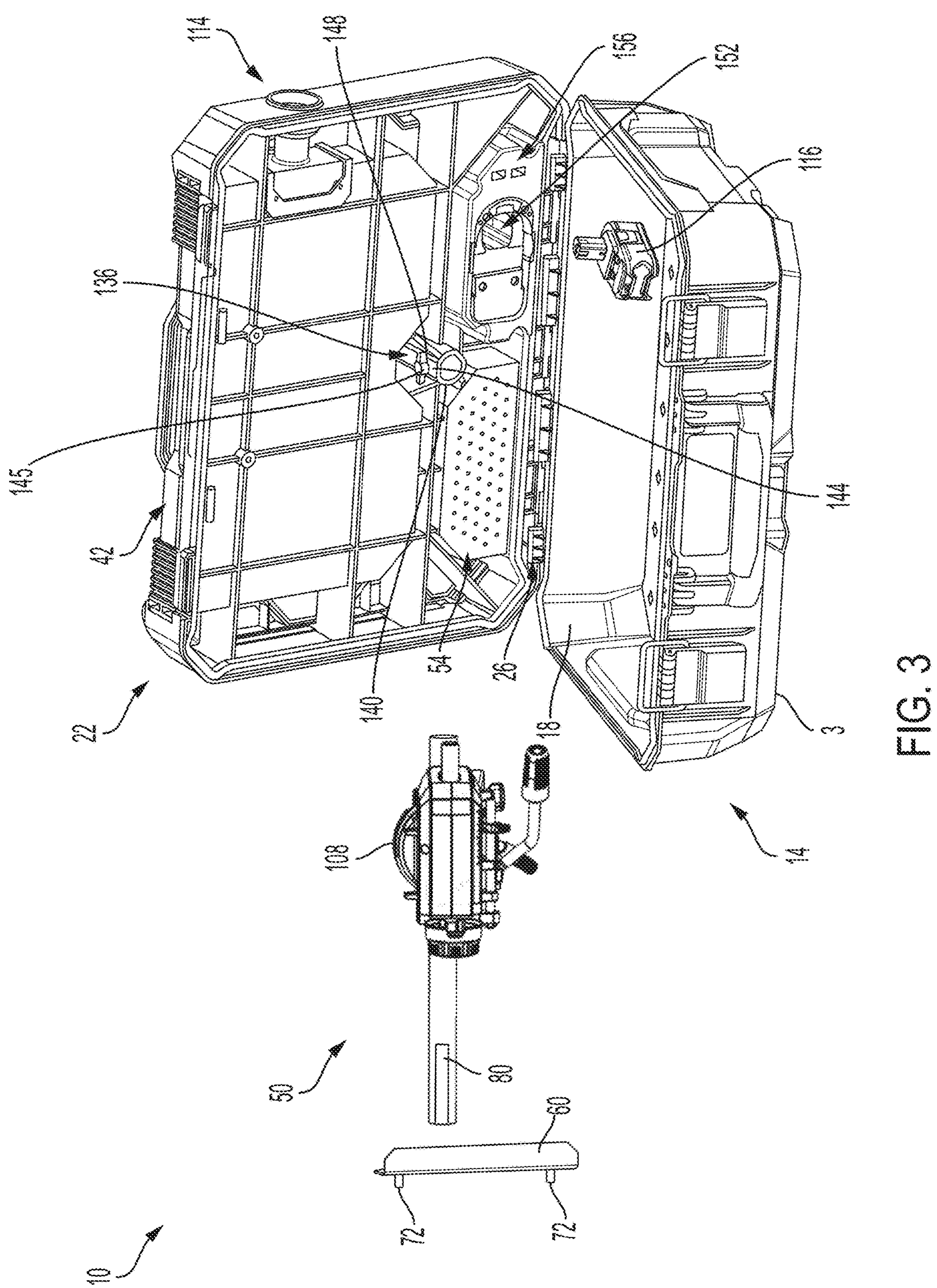
FIG. 3 is a perspective view of the modular work station in an open state, illustrating the power tool system removed from the working platform and showing an underside of the working platform.

Referring now to FIGS. 1-3, in the exemplary embodiment, the drill press assembly 50 includes a mast or column or stem 76 removably coupled to the working platform 22. In the illustrated embodiment, the stem 76 may have a D-shaped cross-section and may be held in place by one or more set screws 145. The head 84 may be supported for movement along the stem 76. For example, the head 84 may be rotatable and/or slidable along the stem. In one example operation, the head 84 of the drill press assembly 50 may be rotated with respect to the stem 76, and a tool head of another tool assembly may be attached to the stem 76. For example, the head 84 may be rotated on the stem 76 by an amount (e.g., 45 degrees, 90 degrees, 180 degrees, etc.). In addition, the head 84 may include a coupling for supporting a power tool 200 (FIG. 1). In some embodiments, the tool may include a rotary tool, a drill, a grinder, etc. In other embodiments, the head may support/include multiple tool assemblies that are each rotatable relative the stem for selective use above or on the table 42.

In the illustrated embodiment, one or more electrical contacts 80 (FIG. 3) may be provided on the stem 76, and the stem 76 may support a head 84 and adjustable head locking clamp/lever 88, a rotating spindle 92, a chuck 96 supported at a working end 100 of the spindle 92 (FIG. 2), a pilot feed lever 104, a motor 108, and one or more depth stops for limiting an amount the pilot feed lever 104 may be moved. The drill press assembly 50 may further include additional couplings for one or more head accessories. For example, some embodiments may include a threaded shaft to which components may be attached. The head accessories may include a magnifying lens, extra hands, a light, a vacuum/suction source, or the like.

In some embodiments, a user may secure the head 84 at a desired height and direction on the stem 76 by locking the clamp 88. The user may also secure a workpiece (e.g., piece or block of wood) to the table 42 while aligning the workpiece via the fence 60. The user may then turn the drill press 50 ON, which thereby drives the spindle 92 through rotational output of the motor 108. Once ON, the user may grasp and operate the pilot feed lever 104 to move the working end 100 of the spindle 92 toward the table 42. The user may create a pilot hole in a workpiece provided the user according to a desired working depth and using a pilot device (e.g., drill bit) coupled to the chuck 96.

During operation of the drill press assembly 50, chips, dust, and/or debris may be generated (e.g., removed from the workpiece during a cutting/drilling operation). Such debris may pass through the relief hole 64 and guide groove 68 and into the table 42. As best shown in FIG. 1, the work station 10 may include one or more exhaust apertures 114 configured to exhaust or vent debris from within the table 42 that may have passed through the relief hole 64, guide groove 68, or another opening. The exhaust apertures 114 help move dust and debris away from the user. In the illustrated embodiment, the exhaust aperture 114 is formed in the platform 22. In other constructions, the exhaust aperture 114 is formed in the table 42.

Referring now to FIGS. 2 and 3, the motor 108 of the illustrated drill press assembly 50 is positioned within the head 84 and selectively receives operating power to drive rotation of the spindle 92 and chuck 96. In other embodiments, the motor may be positioned elsewhere in the work station 10, such as in the storage space 18, on an underside of the platform 22, or another suitable position to communicate rotation of the motor to rotation of the spindle 92. In the illustrated embodiment, as shown best in FIG. 3, the motor 108 may receive power from a battery pack 116, which provides direct current (DC) power to the motor 108 through the one or more electrical contacts 80. The motor 108 may receive alternating current (AC) power through an AC source such as a wired connector, for example. The motor 108 may also be selectively energized through operation of a switch element 120 that is moveable between ON and OFF positions.

In some embodiments, the motor may be omitted, and the tool assembly may be a hand-operated tool assembly. In another embodiment, the tool assembly may be a non-motorized tool assembly that receives operating power from another source such as an external driving mechanism, a motorized rotary power tool, or the like. In one example construction, the tool assembly may be a non-motorized drill press assembly that receives rotational input from an output of a handheld power tool. In such example construction, the handheld power tool may be selectively docked or otherwise removably coupled to the work station 10, particularly during operation of the tool assembly (e.g., while the handheld power tool is providing powered input to the tool assembly).

The battery pack 116 may be a power tool battery pack generally used to power a power tool, such as an electric drill, an electric saw, and the like (e.g., an 18-volt rechargeable battery pack). The battery pack 116 may include lithium ion (Li-ion) cells. In alternate embodiments, the battery pack may be of a different chemistry (e.g., nickel-cadmium (NiCa or NiCad), nickel-hydride, and the like). In the illustrated embodiments, the battery pack 116 may be an 18-volt battery pack. In alternate embodiments or constructions, the capacity of the battery pack may vary (e.g., the battery pack may be a 4-volt battery pack, a 28-volt battery pack, a 40-volt battery pack, or battery pack of any other voltage). The battery pack may further include an indicator to display the current state of charge of the battery pack and/or other characteristics of the battery pack.

As illustrated in FIG. 2, the flexible light 58 may be removably coupled, electrically and mechanically, from the platform 22 such that the platform 22 further includes a locking receptacle 124 configured to support and power the light 58. The receptable 124 may also be covered by a cover 128, flap, or the like. In other embodiments, the receptacle is self-sealing and/or dust/waterproof. The flexible light 58 may alternatively be removably coupled to the tool assembly 50 (e.g., via the threaded shaft). In some embodiments, the light may also include an independent power source (e.g., disposable battery, rechargeable battery, etc.) independent from the battery 116.

In a similar manner to the cover 128, one or more tool accessory compartments 54 may also include a cover 132, or the like, for selectively covering the compartment 54. In some embodiments, the covers 128, 132 are biased into a closed position. As further shown in FIG. 2, the tool assembly 50 may be completely removed from the platform 22. In some embodiments, the stem 76 extends through a support recess or aperture 136 extending through the platform 22, and the tool assembly 50 can be removed from the platform 22 by removing the stem 76 from the aperture 136.

The support recess 136, as shown in FIG. 2, may extend through the platform 22 to the storage space 18 defined by the base 14. An end (e.g., lower) portion of the support recess 136 may be formed by side walls 140, and a set hole 144 may extend through at least one of the side walls 140. The set hole 144 may receive a tightening knob or fastener 148 that may bear against the stem 76 to secure the tool assembly 50 to the platform 22 when the stem 76 is received in the support recess 136. In some embodiments, the support recess 136 and stem 76 includes complementary threads configured to secure the tool assembly to the platform.

As further shown in FIG. 3, the tool assembly 50 may be removed from the platform 22 and stored in the storage space 18 while not in use. The storage space 18 may be sized to store multiple tool assemblies 50 at one time, such as the drill press assembly 50 and a saw assembly. The work station 10 may also be configured to store multiple tool assemblies while another tool assembly is supported on the platform 22 and/or in use. When no tool assembly 50 is attached to the platform, the covers 128, 132 are closed, and the platform 22 is in the closed position, the interface 3 is generally "free" for stacking such that the work station 10 may be stacked and secured with another stacking element 2.

The platform 22 may further include, according to the illustrated construction, one or more battery pack receptacles 152, and one or more USB ports 156. The battery pack receptacles 152 and/or the USB ports 156 may be positioned in the storage space. The USB ports 156 may be configured to connect with a personal device of a user (e.g., cell phone, personal flashlight, etc.) to provide charging power from the one or more battery packs 116 to the user's device, provided the battery pack 116 has sufficient charge and is received in the battery pack receptacle 152. The USB ports 156 may alternatively be another type of computer compatible connector such as a USB-C port, a MICRO-USB port, etc. The USB ports 156 could also be another type of port suitable to provide charging power, communication, or the like.

Figures 6A, 6B:
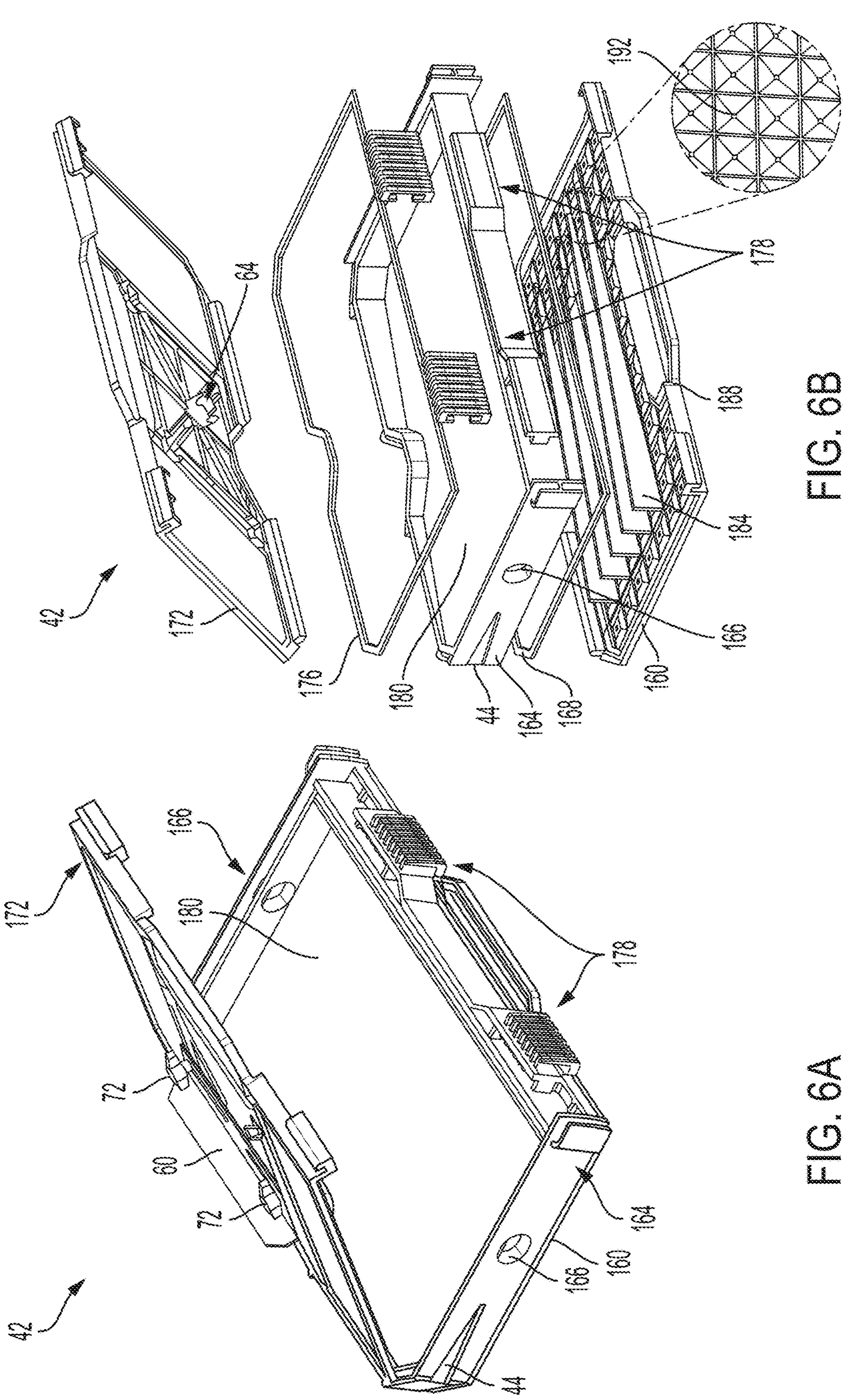
FIG. 6A is an isolated perspective view of the table portion in an open position.
FIG. 6B is an isolated exploded view of the table portion of FIG. 6A, illustrating an additional surface of the table.

Referring now to FIGS. 6A and 6B, the table 42 further includes a base panel 160, a base body 164 extending from the base panel 160, a sealing gasket 168 positioned between the base panel 160 and base body 164, a cover and working surface 172 coupled to either of the base panel 160 or base body 164, an upper sealing gasket 176 positioned between the cover 172 and base body 164, and a latching assembly 178 configured to selectively retain the cover 172, base body 164, and base panel 160 in a closed position. In the illustrated embodiment, the table 42 and/or working surface 172 may be reversible and/or interchangeable to provide different types of working surfaces. As shown in FIGS. 6A and 6B, the table 42 can be selectively positioned in a first orientation in which the working surface 172 faces away from the power tool 50 and a second orientation in which the working surface 172 faces toward the power tool 50.

As best shown in FIG. 6B, the base body 164 may include one or more inner outlets/apertures 166 that substantially align with the one or more exhaust outlets/apertures 114 and a slanted false bottom sheet 180 configured to guide dust and debris from the relief hole 64 and channels 68 to the one or more inner apertures 166 and further to the one or more exhaust apertures 114. The false bottom sheet 180 may be supported by angled fins or flanges 184 that may be formed on the base panel 160 to provide a slanted surface upon which the false bottom sheet 180 is supported. The sealing gaskets 168, 176 may be compressed to prevent dust or debris from escaping an inside area of the table 42, except through the apertures 166.

As further shown in FIG. 6B, the base panel 160 may further include a downdraft surface 188. Similar to the cover and working surface 172, the downdraft surface 188 may be rotated to an open position. The downdraft surface 188 may include a grid or pattern of tapered depressions each having a central recess 192 that extends through panel 160 and into the table 42. The pattern of recesses 192 are configured on the panel 160 to generate a downdraft (e.g., fume and/or debris extraction) between the recesses 192 and the more inner apertures 166/exhaust apertures 114. In the illustrated embodiment, the working surface 172 and the downdraft surface 188 are supported on opposing sides of the table 42 such that the table 42 may be flipped or reversed in order to utilize a desired surface. In other embodiments, the working surface 172 and the downdraft surface 188 are selectively removable/attachable to the table 42.

During the example cutting or drilling operations described above, the table 42 may fill with excess debris over time. In one example, the user may remove the table 42 from the seat 46, unlatch the latch assembly 178, open the cover 172 or downdraft surface 188, and remove the excess debris from within the table 42. In another example, the user need not remove the table 42 from the seat 46 to open the cover 172 downdraft surface 188 and empty the table 42. In still another example, the user may attach a suction device (e.g., vacuum, pump, etc.) to the aperture 114, which forms an outlet, to assist in removal of excess debris from the table 42. In still another scenario, such suction means may receive from the battery pack 116 and may be integrated within the work station 10. In the illustrated embodiment, when attached, the suction device is in fluid communication with the recesses 192 in the downdraft surface 188, the relief hole 64 and channels 68, the one or more inner apertures 166, the one or more exhaust apertures 114, and/or the like.

FIGS. 7-9B illustrate a work station 210 according to another embodiment. The work station 210 of FIGS. 7-9B is similar to the work station 10 described above with reference to FIGS. 1-6B, and similar features are identified with similar reference numbers, plus "200." Some similarities and differences between the work station 210 and the work station 10 are described below.

Figure 7:
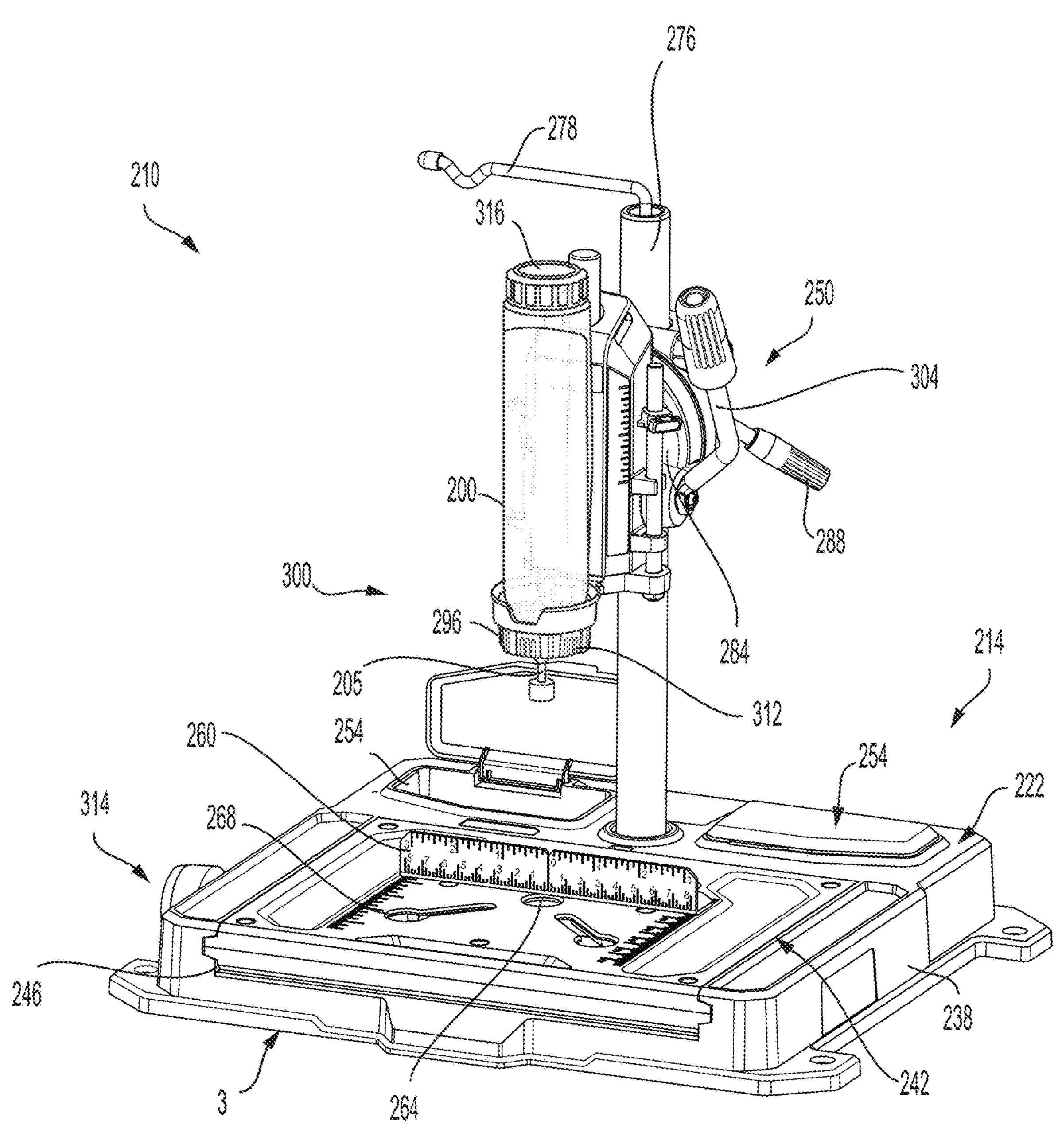
FIG. 7 is a perspective view of a work station and power tool system according to one embodiment, usable with the stackable work station and storage system of FIG. 1 or in a standalone application, illustrating a power tool and a table in a first orientation.

Referring to FIG. 7, the work station 210 may include a base 214 having side ledges 238 and a working platform 222, and a power tool assembly 250 that may be removably coupled to the base 214 and/or working platform 222. The base 214 may further include the mating interface 3 or another surface complementary or similar to the mating interface 3 such that the work station 210 can be stacked on a desired number of stacking elements 2. Similar to above, the working platform 222 provides a working/project surface for a user and may be configured differently depending on a desired task or project.

Figure 8:
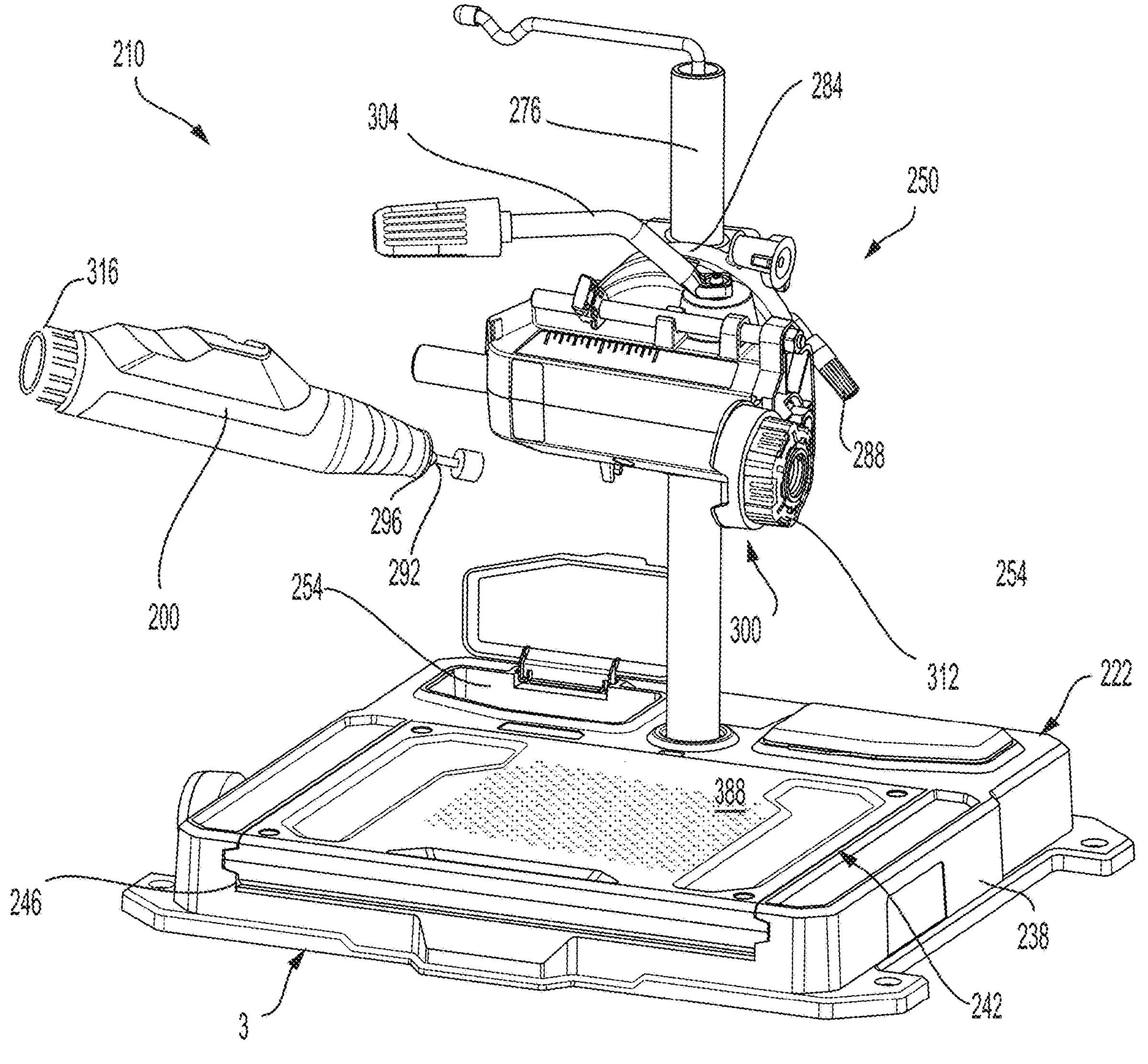
FIG. 8 is a perspective view of the work station and power tool system of FIG. 7, illustrating the power tool in one example position and illustrating the table in a second orientation.

With reference to FIGS. 7 and 8, the working platform 222 supports a removable table 242, a seat 246, and the removable and interchangeable tool assembly 250. The seat 246 and table 242 are configured similarly to the table 42 and the seat 46 such that table 242 can be received and retained to the base 214 for use with the working platform 222. Also like the table 42, the table 242 may also be reversible and include different working surfaces configured for different operations.

In the illustrated embodiment the interchangeable power tool assembly 250 includes a power tool 200 such as a powered rotary tool 200, and the table 242 accommodate use of the rotary tool as a drill press. For example, the table 242 includes an adjustable fence 260, a relief hole 264 for receiving an end of a pilot device (e.g., drill bit), guide grooves 268, and one or more fasteners 272 (FIG. 9A) for securing the fence 260 and/or a workpiece to the table 242 in a desired configuration. In some embodiments, the fasteners and fence may include a vice, an adjustable clamp, or another device suitable to secure an object or workpiece to the table.

Further, the powered rotary tool 200 may include a rotating spindle 292 at a working end 300 of the tool assembly 250 and a chuck 296 supported at a driven end of the spindle 292. As illustrated in FIG. 8, the powered rotary tool 200 may be removably coupled to a tool receptacle 312 at the working end 300. In the illustrated embodiment, a portion of the housing of the rotary tool 200 adjacent the bit may have a threaded surface that engages with a threaded surface of the tool receptacle 312 to secure the powered rotary tool 200 to the tool assembly 250. In other embodiments, the powered rotary tool 200 may be coupled to the tool receptacle 312 by another connection type, such as a ball-and-detent, magnets, a clamp, and/or the like.

In some embodiments, the interchangeable power tool assembly 250 includes multiple tools, such as a table saw, a bandsaw, a cordless drill, a belt sander, a die grinder, or the like. In some embodiments, the interchangeable power tool assembly 250 includes a plurality of different interchangeable power tools. The power tool 200 may be an alternating current (AC) powered power tool or a direct current (DC) powered power tool.

With continued reference to FIGS. 7 and 8, the base 214 and/or working platform 222 may also include one or more tool accessory (e.g., drill bit, socket, etc.) storage compartments 254 and/or other accessories (e.g., lights, clamp, etc.).

Referring still to FIGS. 7 and 8, the illustrated tool assembly 250 includes a stem 276, column, boom, and/or the like removably coupled to the working platform 222. In the illustrated embodiment, the stem 276 may be cylindrical and may support a head 284 and an adjustable head locking clamp/lever 288, and, in some embodiments, a pilot feed lever 304, and one or more depth stops for limiting an amount the pilot feed lever 304 may be moved. The head 284 may further be rotatably and height-adjustably supported on the stem 276. In one example operation, the head 284 of the tool assembly 250 may be rotated with respect to the stem 276, and a tool head of another tool assembly or tool may be attached to the stem 276. For example, as illustrated in FIG. 8, the head 284 may be rotated on the stem 276 by an amount (e.g., 45 degrees, 90 degrees, 180 degrees, etc.), and a second tool head such as a grinder head may be attached to the stem 276 to be used in a space above the table 242. In another embodiment, the head may support/include multiple tool assemblies that are each rotatable relative the stem 276 for selective use above or on the table 242. The stem 276 may further support an arm 278. The arm 278 may be a limb, hook, rod, and/or the like and may be configured to receive a cord, a line, and/or a support of a power tool (e.g., the power tool 200). In the illustrated embodiment, the arm 278 is positioned at a top end of the stem 276.

It should be understood that operation, use, adjustment, and/or the like of the tool assembly 250 is similar to that of the drill press assembly 50 described above (e.g., desired height and orientation adjustment, locking a workpiece to the fence 260, creating a pilot hole, etc.). For example, the tool assembly 250 may include a motor that may receive power from a battery pack 316, like the battery pack 116, which provides direct current (DC) power to the motor through one or more electrical contacts. The motor may alternatively receive alternating current (AC) power through an AC source such as a wired connector, for example. The motor may also be selectively energized through operation of a switch element (e.g., ON/OFF element), a user input, or the like, as described in greater detail below with particular reference to FIG. 10.

In some embodiments, the motor may be omitted, and the tool assembly may be a hand-operated tool assembly. In another embodiment, the tool assembly, with the motor, may be integrated into the tool assembly such that the tool assembly directly receives operating power rather than relying on a motorized rotary power tool, cutter, wrench, or the like. In one example construction, as illustrated in FIGS. 7 and 8, the handheld power tool 200 may be selectively docked or otherwise removably coupled to the work station 210, particularly during operation of the tool assembly 250 (e.g., while the handheld power tool is providing powered input to the tool assembly).

Figure 9A:
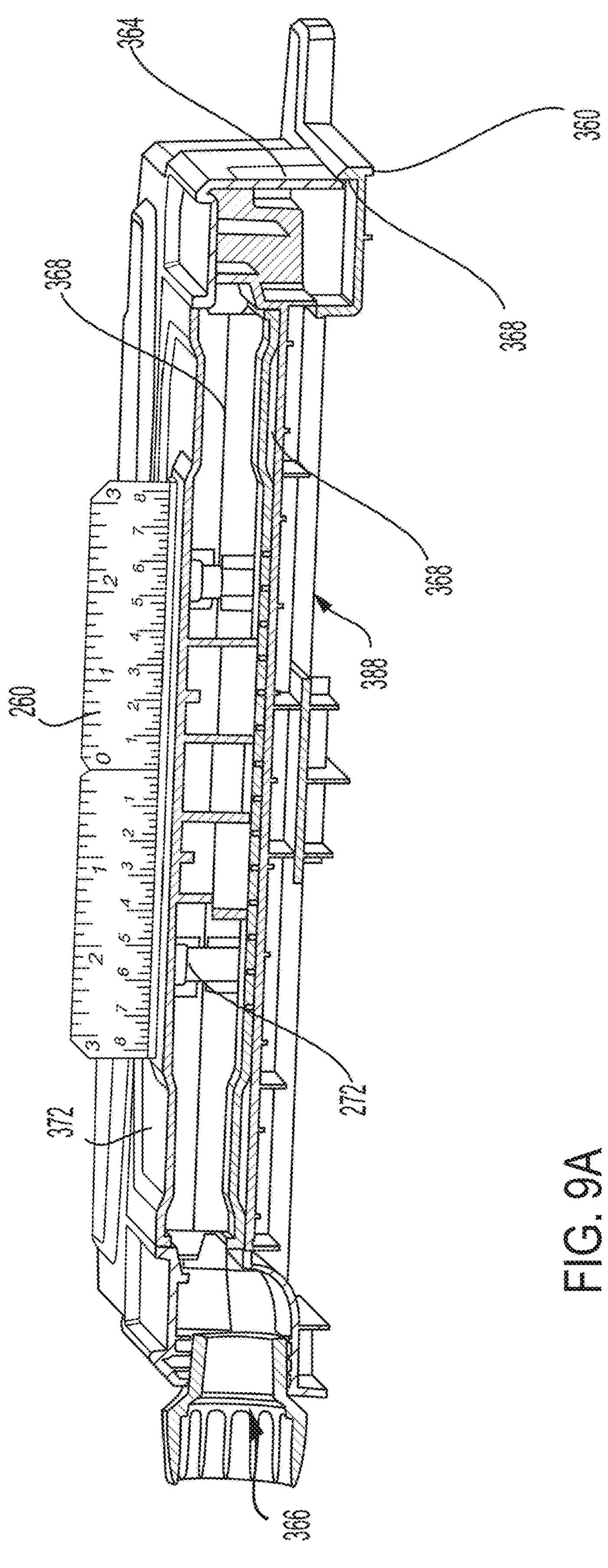
FIG. 9A is a cross-sectional view of the table of FIG. 7 in a closed position.

In a common manner, as described above with relation to the work station 10, during operation of the drill press assembly 250, chips, dust, and/or debris may be generated (e.g., removed from the workpiece during a cutting/drilling operation). Such debris may pass through the relief hole 264 and the guide groove 268 and into the table 242. As best shown in FIG. 9A, the work station 210 may include one or more exhaust apertures 314 configured to exhaust or vent debris from within the table 242 that may have passed through the relief hole 264, guide groove 268, or another opening. The exhaust apertures 314 help move dust and debris away from the user. In the illustrated embodiment, the exhaust aperture 314 is formed as one or more vents at least partially poisoned in the table 242. In other constructions, the exhaust aperture 314 is formed in the platform 222.

Similar to the platform 22, the platform 222 may further include, according to some embodiments, one or more battery pack receptacles and one or more USB ports. The battery pack receptacles and/or the USB ports may be positioned on the working platform 222 (e.g., on edges 238, adjacent the stem 276, or the like). The USB ports may be configured, like the USB ports 116, to connect with a personal device of a user (e.g., cell phone, personal flashlight, etc.) to provide charging power from the one or more battery packs 316 to the user's device, provided the battery pack 316 has sufficient charge and is received in the battery pack receptacle. The USB ports may alternatively be another type of computer compatible connector such as a USB-C port, a MICRO-USB port, etc. The USB ports could also be another type of port suitable to provide charging power, communication, or the like.

Figure 9B:
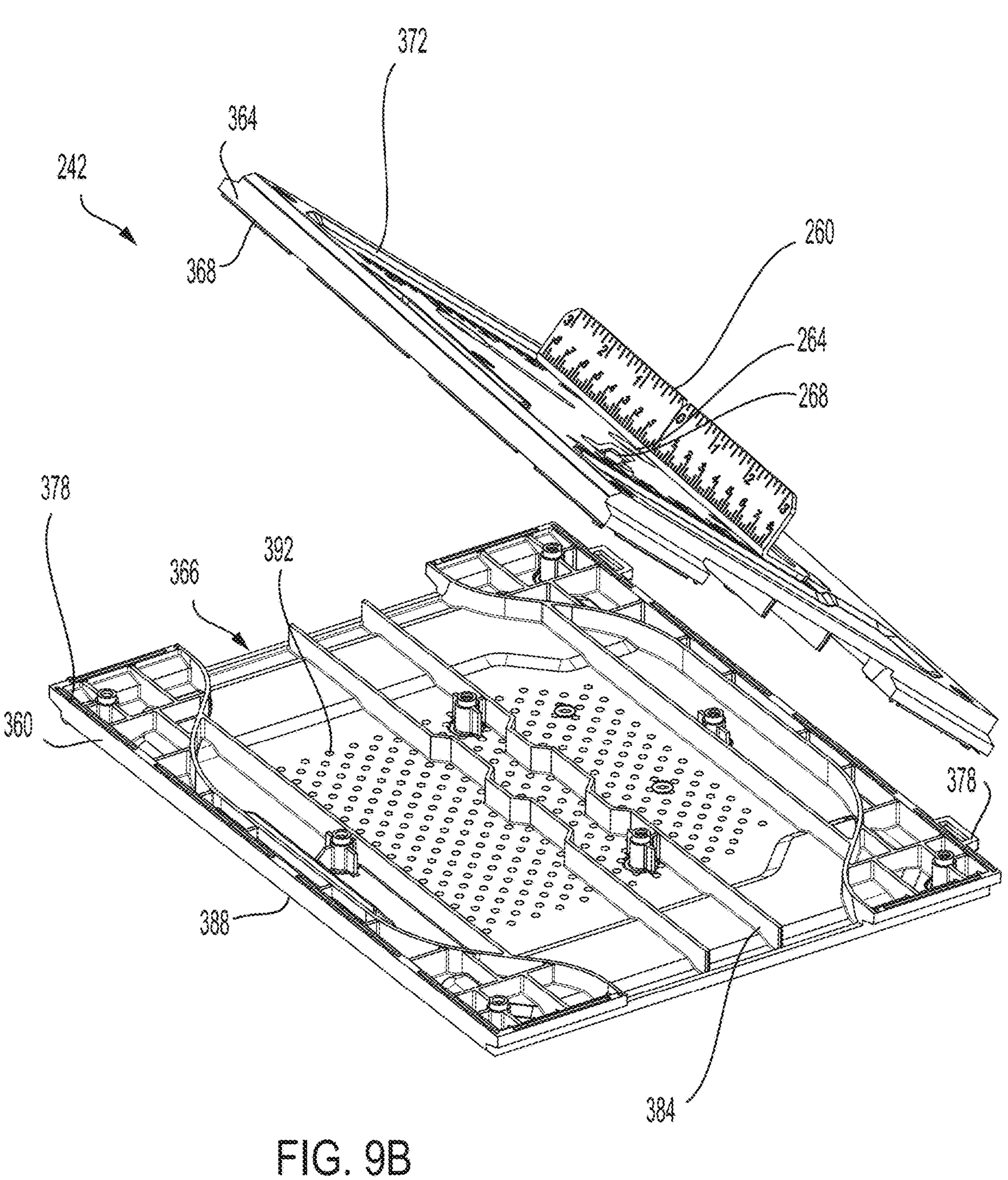
FIG. 9B is an isolated exploded view of the table of FIG. 9A, illustrating an additional surface of the table.

Referring now to FIGS. 9A and 9B, the table 242 further includes a base panel 360, a base body 364 extending from the base panel 360, and a sealing gasket 368 positioned between the base panel 360 and base body 364. In the illustrated embodiment, the table 242 and/or a working surface 372 may be reversible and/or interchangeable to provide different types of working surfaces. The working surface 372 may double as a cover, and a latching mechanism 378 configured to selectively retain the cover 372, base body 364, and base panel 360 in a closed position may be included on a portion of the table 242.

As best shown in FIG. 9B, the base body 364 may include one or more inner apertures 366 that substantially align with the one or more exhaust apertures 314 configured to guide dust and debris from the relief hole 264 and channels 268 to the one or more inner apertures 366 and further to the one or more exhaust apertures 314 (FIG. 7). The base body 364 may include fins or flanges 384 that may form discrete airflow passages within the base body 364. The sealing gasket 368 may be compressed to prevent dust or debris from escaping an inside area of the table 242, except through the apertures 366. The gasket 368 may further be positioned between the flanges 384 and the base body 364 or base panel 360.

As further shown in FIG. 9B, the base panel 360 may further include a downdraft surface 388. Similar to the cover and working surface 372, the downdraft surface 388 may be rotated to an open position. The downdraft surface 388 may include a grid or pattern of tapered depressions each having a central recess 392 that extends through panel 360 and into the table 242. In some embodiments, the downdraft surface 388 may include a grid or pattern of the recesses 392 with no tapered depressions. The pattern of recesses 392 are configured on the panel 360 to generate a downdraft between the recesses 392 and the more inner apertures 366/exhaust apertures 314. In the illustrated embodiment, the working surface 372 and the downdraft surface 388 are supported on opposing sides of the table 242 such that the table 242 may be flipped or reversed in order to utilize a desired surface. In other embodiments, the working surface 372 and the downdraft surface 388 are selectively removable/attachable to the table 242.

During the example cutting or drilling operations described above, the table 242 may fill with excess debris over time. In one example scenario, the user may remove the table 242 from the seat 246, unlatch the latching mechanism 378, open the cover 372 or downdraft surface 388 to an open position, and remove the excess debris from within the table 242. In another example scenario, the user need not remove the table 242 from the seat 246 to open the cover 372 downdraft surface 388 and empty the table 242. In still another example scenario, the user may attach a suction means (e.g., vacuum, pump, etc.) to the aperture 314 to assist in removal of excess debris from the table 242. In still another scenario, such suction means may receive power from the battery pack 316 and may be integrated within the work station 210.

With continued reference to the example cutting or drilling operations, the power tool 200 holds a tool bit via a tool bit holder 205. The tool bit holder 205 may be configured to hold tool bits of varying types and size, such as, but not limiting to, drill bits, router bits, auger bits, spade bits, forstner bits, step bits, hole saws, and the like. Tool bits may be held in the tool bit storage compartments 254 when not retained to the tool 200. While illustrated as a plurality of holes in which the tool bits are placed, in some embodiments, the tool bit storage compartments 254 may be one or more drawers, similar to the what has been described with reference to the tool accessory compartments 54.

As detailed above, the table 242, which may be a top-mounted router table 242, provides a surface for a workpiece, such as a block of wood, to be operated on by the power tool 200. One or more retainers or clamps may be positioned on the table 242 and/or working platform 222 to assist in holding the workpiece to the table 242. In some embodiments, the clamps may be, or include, a vise, helping hands, or another type of tool to secure a workpiece to the top-mounted router table 242. In some embodiments, a bottom of the router table 242 includes a downdraft table (e.g., a fume extractor having the downdraft surface 388). The downdraft table allows debris from the workpiece to be easily removed.

Figure 10:
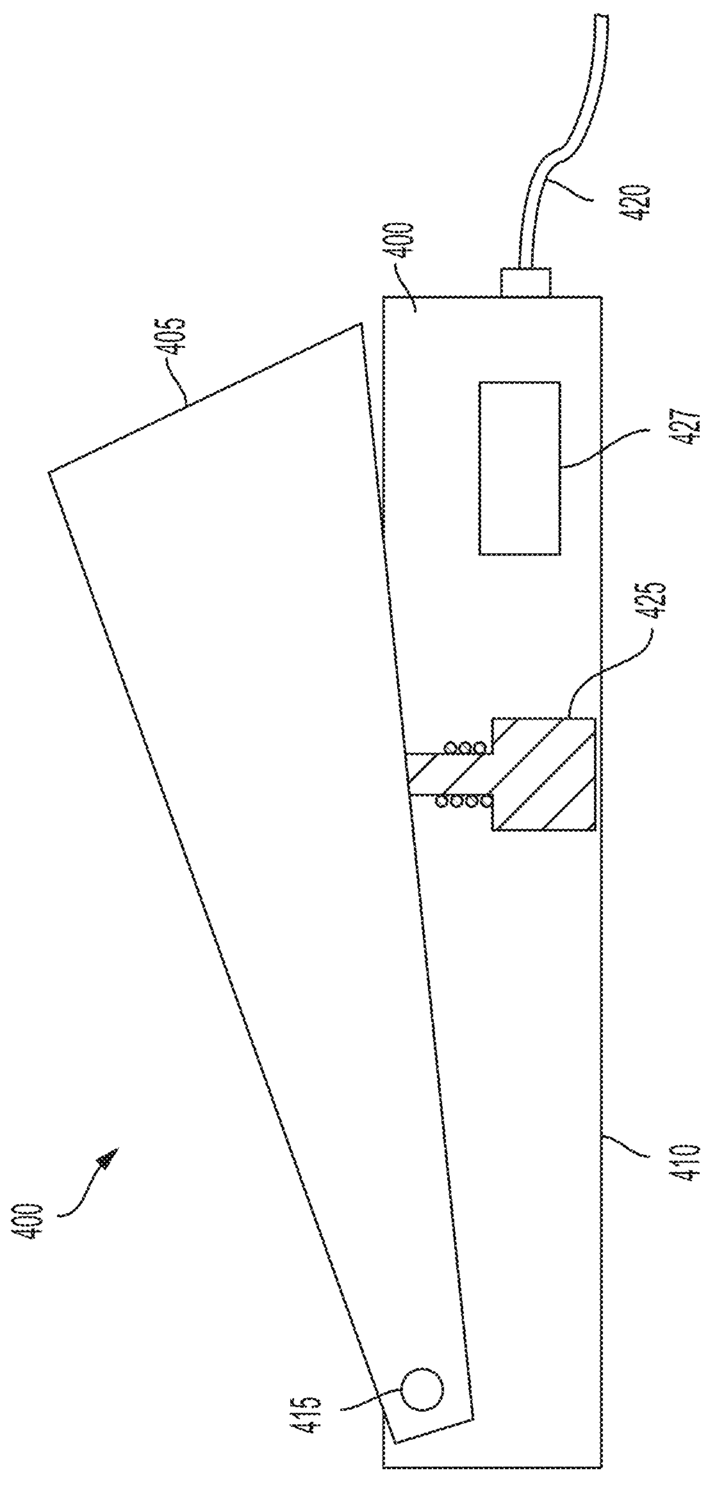
FIG. 10 is a side view of a foot pedal according to some embodiments, useable with the power tool systems of FIGS. 3 and 7.

FIG. 10 illustrates a foot pedal 400 including an upper pedal housing 405, a lower pedal housing 410, a housing joint 415, a cable 420, and a sensor 425 according to some embodiments. The upper pedal housing 405 and the lower pedal housing 410 are coupled via the housing joint 415. The sensor 425 may be, for example, an angle sensor, a force sensor, a pressure sensor, a diaphragm, a potentiometer, or the like. In operation, a user may press the upper pedal housing 405 toward the lower pedal housing 410. Movement of the upper pedal housing 405 is detected by the sensor 425. For example, in configurations in which the sensor 425 is an angle sensor, the sensor 425 detects the change in angle of the upper pedal housing 405 as it moves down and energized the tool 50, 200 (e.g., motor) accordingly. In configurations in which the sensor 425 is a pressure sensor, the sensor 425 detects the increase in pressure as the user presses the upper pedal housing 405 toward the lower pedal housing 410.

The cable 420 may be a power cable, a communication cable, or a combination thereof. For example, the cable 420 may provide the foot pedal 400 with alternating current (AC) or direct current (DC) power from an AC power source or a DC power source. In some embodiments, the cable 420 is a communication cable connected to the power tool 50, 200 and provides the power tool 50, 200 with signals from the sensor 425 indicative of the position of the upper pedal housing 405. In some embodiments, the foot pedal 400 includes a controller 427 configured to control power provided to the power tool 50, 200 based on a signal received from the sensor 425. In other embodiments, the foot pedal 400 provides a controller of the power tool 50, 200 with a signal from the sensor 425 associated with movement of the upper pedal housing 405.

Figure 11:
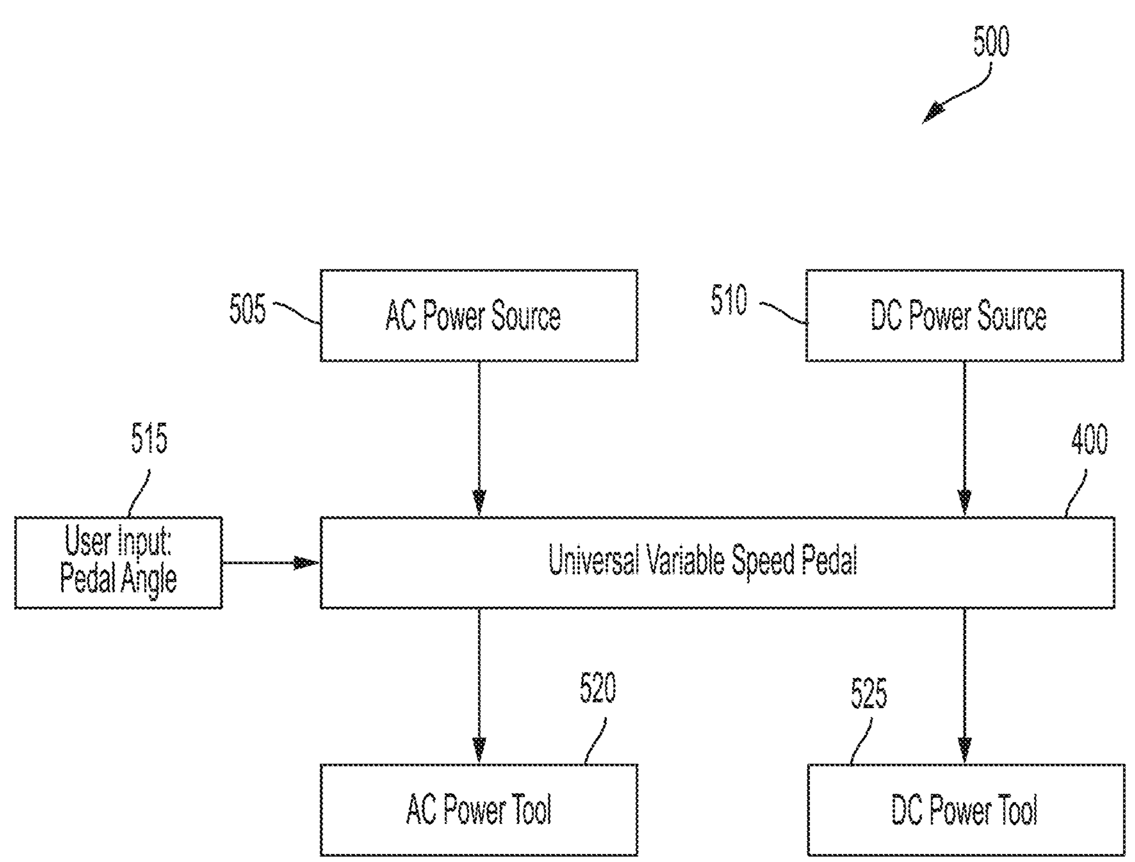
FIG. 11 is a block diagram of the power tool systems according to some embodiments.

The foot pedal 400 may be configured to function with the power tool 50, 200 according to several variations. For example, FIG. 11 provides a system 500 for integrating the foot pedal 400 with the power tool 50, 200. The system 500 includes an AC power source 505, a DC power source 510, the foot pedal 400, an AC power tool 520, and a DC power tool 525. In some embodiments, the foot pedal 400 is connected to only one of the AC power source 505 and the DC power source 510 at a given time. Additionally, the foot pedal 400 may only be connected to one of the AC power tool 520 or the DC power tool 525 at a given time. The AC power tool 520 and the DC power tool 525 may be, for example, the power tool 50, 200.

In some embodiments, when the AC power tool 520 is connected to the foot pedal 400, the AC power source 505 is connected to the foot pedal 400 to provide the appropriate power type. Alternatively, when the DC power tool 525 is connected to the foot pedal 400, the DC power source 510 may be connected to the foot pedal 400. In other embodiments, an AC/DC power converter or DC/AC power converter may be used to provide the AC power tool 520 or the DC power tool 525 with the appropriate power.

In some embodiments, the foot pedal 400 provides the AC power tool 520 or the DC power tool 525 with power based on the user input 515. The user input 515 may be, for example, the signal from the sensor 425 associated with movement of the upper pedal housing 405. In some embodiments, the user input 515 is provided to the controller 427. Accordingly, the AC power tool 520 or the DC power tool 525 are controlled by the controller 427 and based on the user input 515.

Figure 12:
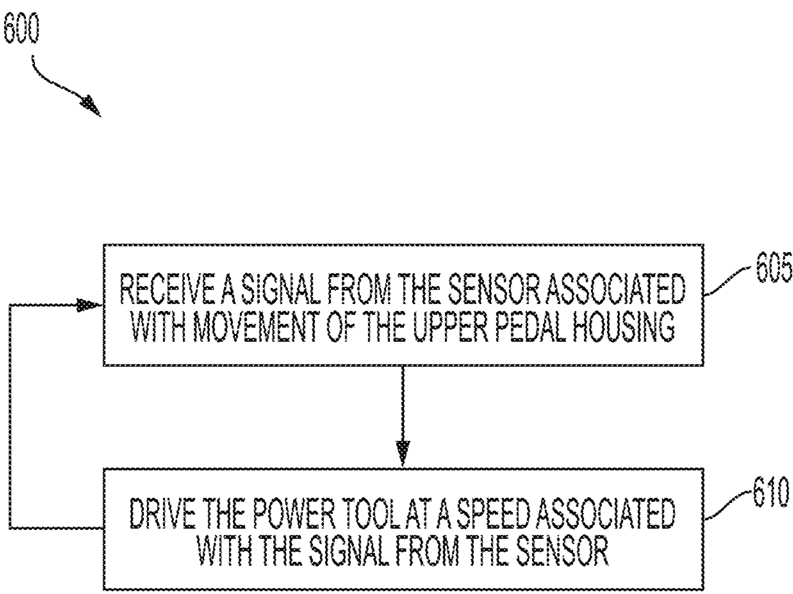
FIG. 12 is a block diagram of a method conducted by the power tool systems according to some embodiments.

FIG. 12 provides a method 600 of controlling a power tool 50, 200 based on the user input 515 according to some embodiments. The method 600 may be performed by the controller 427.

At block 605, the method 600 includes receiving a signal from the sensor 425 associated with movement of the upper pedal housing 405. For example, the AC power tool 520 or the DC power tool 525 receives the user input 515 from the foot pedal 400.

At block 610, the method 600 includes driving the power tool 50, 200 at a speed associated with the signal from the sensor 425. For example, an amount of power provided to a motor of the power tool 50, 200 is dependent on the signal from the sensor 425. The amount of power provided to the motor may be controlled using a rheostat, a triac, a variable transformer, or the like. The further the upper pedal housing 405 is pressed, the greater the power provided to the motor.

Figure 13:
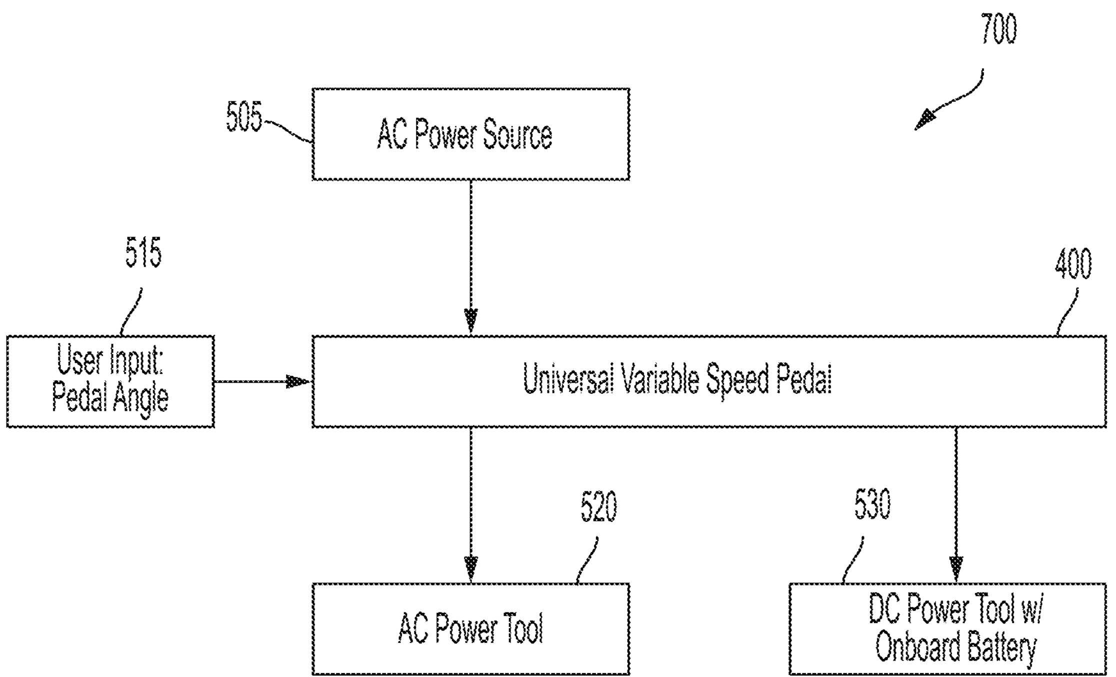
FIG. 13 is a block diagram of the power tool systems according to some embodiments.

FIG. 13 provides a system 700 for integrating the foot pedal 400 with the power tool 50, 200 according to some embodiments. Similar to the system 500, the system 700 includes the AC power source 505, the foot pedal 400, and the AC power tool 720. The system 700 further includes a DC power tool 530 that includes an onboard battery. For example, rather than receive power from the foot pedal 400, the DC power tool 530 may include a battery pack that provides power to a motor of the DC power tool 530. When driving the motor of the power tool 50, 200, the foot pedal 400 may provide the user input 515 to a controller of the battery pack. Accordingly, the battery pack controller provides power to the motor (e.g., motor 108) of the power tool 50, 200 based on the user input 515. The battery pack controller may vary the amount of voltage or amperage provided to the DC power tool 530 to control power to the motor.

Figure 14:
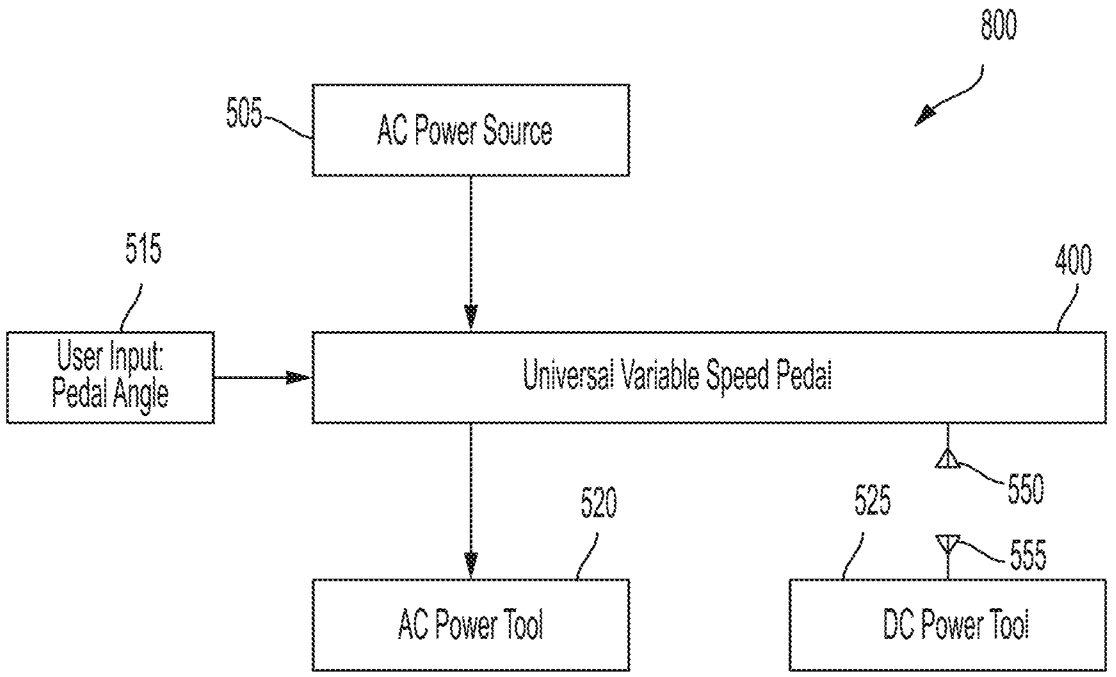
FIG. 14 is a block diagram of the power tool systems according to some embodiments.

FIG. 14 provides a system 800 for integrating the foot pedal 400 with the power tool 50, 200 according to some embodiments, in which the foot pedal 400 is powered by the AC power source 505. In system 800, the foot pedal 400 and the DC power tool 525 are wirelessly connected via a first antenna 550 (e.g., a first transceiver) and a second antenna 555 (e.g., a second transceiver). The foot pedal 400 provides the user input 515 to the DC power tool 525 using the first antenna 550. The DC power tool 525 receives the user input 515 using the second antenna 555. As previously described, provided to the motor of the DC power tool 525 is then controlled based on the user input 515.

Figure 15:
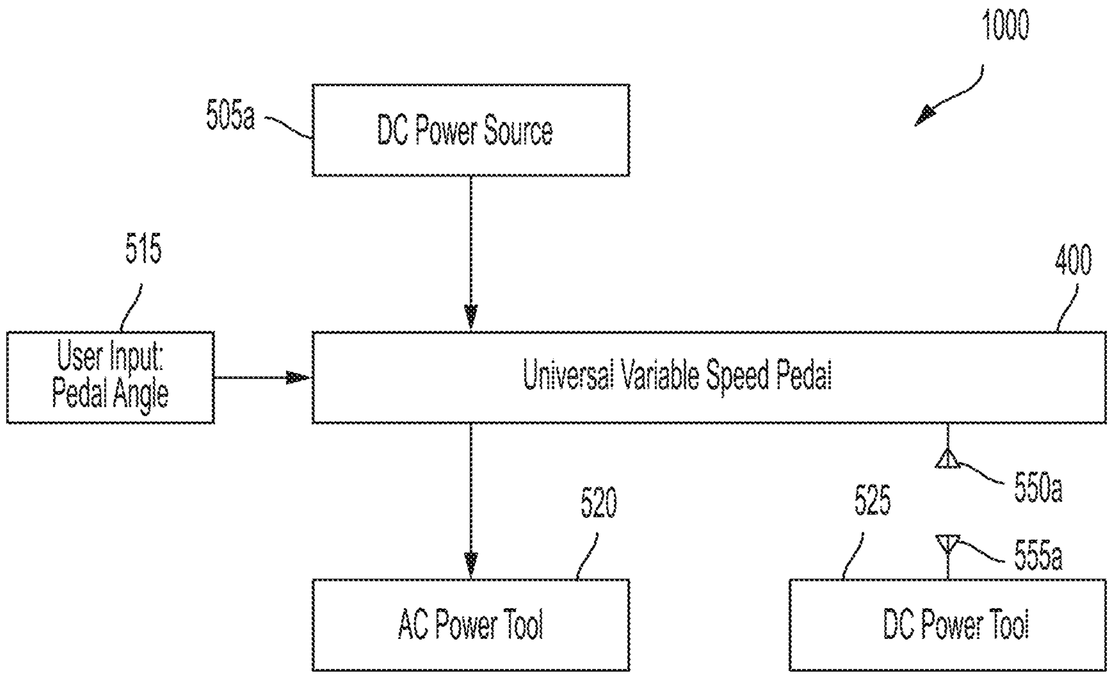
FIG. 15 is a block diagram of the power tool systems according to some embodiments.

FIG. 15 provides a system 1000 for integrating the foot pedal 400 with the power tool 50, 200 according to some embodiments in, which the foot pedal 400 and/or tool is powered by an alternate DC power source 505*a*. In the system 1000, the foot pedal 400 and the DC power tool 525 (or AC power tool 520 is some embodiments) are wirelessly connected via an alternate first antenna 550*a* (e.g., a first transceiver) and an alternate second antenna 555*a* (e.g., a second transceiver). The foot pedal 400 provides the user input 515 to the DC power tool 525 using the alternate first antenna 550*a*. The DC power tool 525 receives the user input 515 using the alternate second antenna 555*a*. As previously described, power provided to the motor of the DC power tool 525 is then controlled based on the user input 515. In some embodiments, the foot pedal 400 and/or power tools 50, 200 may be selectively or interchangeably powered by the AC and DC power sources 505, 505*a*.

The foot pedal 400 may couple to the power tool 50, 200 in several different embodiments. As previously described, the foot pedal 400 may couple to the power tool 50, 200 via the cable 420. The cable 420 may be removable from the foot pedal 400 and the power tool 50, 200 such that it is separately stored. In some embodiments, the cable 420 is permanently coupled to the foot pedal 400. In some embodiments, the foot pedal 400 and the power tool 50, 200 are permanently coupled via the cable 420. The foot pedal 400 and the power tool 50, 200 may instead be wirelessly coupled (via the first antenna 550 and the second antenna 555 of FIG. 14 or via the alternate first antenna 550*a* and the alternate second antenna 555*a* of FIG. 14). The foot pedal 400 and the power tool 50, 200 may be coupled via adapters specific for the type of desired power tool 50, 200. In some embodiments, power is provided to the power tool 50, 200 by the foot pedal 400 (e.g., through the cable 420) from either of the AC and DC power sources 505, 505*a*.

Although aspects have been described in detail with reference to certain embodiments, variations and modifications exist within the scope of one or more independent aspects as described.

The invention claimed is:

1. A work station comprising:
- a platform defining a working surface configured to support a tool assembly, the platform including a seat;
- a base portion supporting the platform; and
- a table removably coupled to the platform on the seat,
- wherein, when the table is positioned on the seat, the table and the seat are secured to each other by an attachment structure having a tab formed on the seat or the table and a slot formed on the other of the seat or the table.

2. The work station of claim 1, wherein the tab and the slot define a snap-fit engagement between the seat and the table.

3. The work station of claim 1, wherein the table includes a first side configured for a first operation and a second side opposite the first side and configured for a second operation different from the first operation, and wherein the table is selectively coupled to the platform adjacent to the tool assembly in a first orientation in which the first side is configured to face the tool assembly, and in a second orientation in which the second side is configured to face the tool assembly.

4. The work station of claim 3, wherein the tab is formed within the seat and the slot is a first slot on the table, wherein the table includes a second slot opposite the first slot, and wherein the tab is engaged with the table within the second slot when the table is coupled to the platform in the second orientation.

5. The work station of claim 4, wherein the tab is engaged with the table within the first slot when the table is coupled to the platform in the first orientation.

6. The work station of claim 1, wherein the tab extends from the platform over the working surface and the slot is recessed in a side of the table, and wherein the tab is engaged with the slot when the table is coupled to the platform.

7. The work station of claim 1, wherein the table includes a relief slot configured to receive a blade of the tool assembly.

8. The work station of claim 1, wherein the table is constructed to be complementary to the tool assembly supported on the platform.

9. The work station of claim 1, wherein the tool assembly includes a tool selected from a rotary drill press, a miter saw, a table saw, a bandsaw, a cordless drill, a sander, and a die grinder, and wherein the table includes an adjustable fence complementary to the tool and at least one groove configured to attach the adjustable fence to the table.

10. A work station comprising:
- a first working surface configured to support a tool assembly;

a base portion supporting the first working surface; and a table removably coupled to the first working surface or the base portion, the table including a cover at least partially defining a second working surface, a base panel disposed opposite the cover, and a base body disposed between and coupled to the cover and the base panel, the cover rotatably coupled to the base body, and the table further including a latch assembly configured to selectively retain the cover, the base body, and the base panel in a closed position.

11. The work station of claim 10, wherein the table includes a first side configured for a first operation and a second side opposite the first side and configured for a second operation different from the first operation, wherein the table is selectively coupled to the first working surface adjacent to the tool assembly in a first orientation in which the first side is configured to face the tool assembly, and in a second orientation in which the second side is configured to face the tool assembly.

12. The work station of claim 11, wherein the base body includes a first outlet and a second outlet that is on an opposite side of the base body from the first outlet, wherein the base portion includes an exhaust aperture, wherein, in the first orientation, the first outlet is aligned with the exhaust aperture, and wherein, in the second orientation, the second outlet is aligned with the exhaust aperture.

13. The work station of claim 10, wherein the cover includes a relief hole and the base portion includes an exhaust aperture, wherein the base body includes an outlet aligned with the exhaust aperture when the table is coupled to the first working surface, and the base body further includes a slanted sheet configured to guide debris from the relief hole to the outlet.

14. A work station comprising:

a platform defining a working surface configured to removably support a tool assembly including a motor, and the platform including a battery receptacle configured to support a battery pack electrically coupled to the motor by one or more electrical contact;

a base portion supporting the platform; and a table removably coupled to the working surface or the base portion, wherein the base portion is configured to store at least a portion of the battery pack.

15. The work station of claim 14, wherein the tool assembly further includes a stem removably coupled to the platform and supporting the one or more electrical contact and a tool of the tool assembly.

16. The work station of claim 14, wherein the platform includes an aperture and the one or more electrical contact is disposed in the aperture.

17. The work station of claim 14, wherein the platform includes a locking receptacle configured to receive a light removably and electrically coupled to the platform.

* * * * *